UNITED STATES PATENT OFFICE.

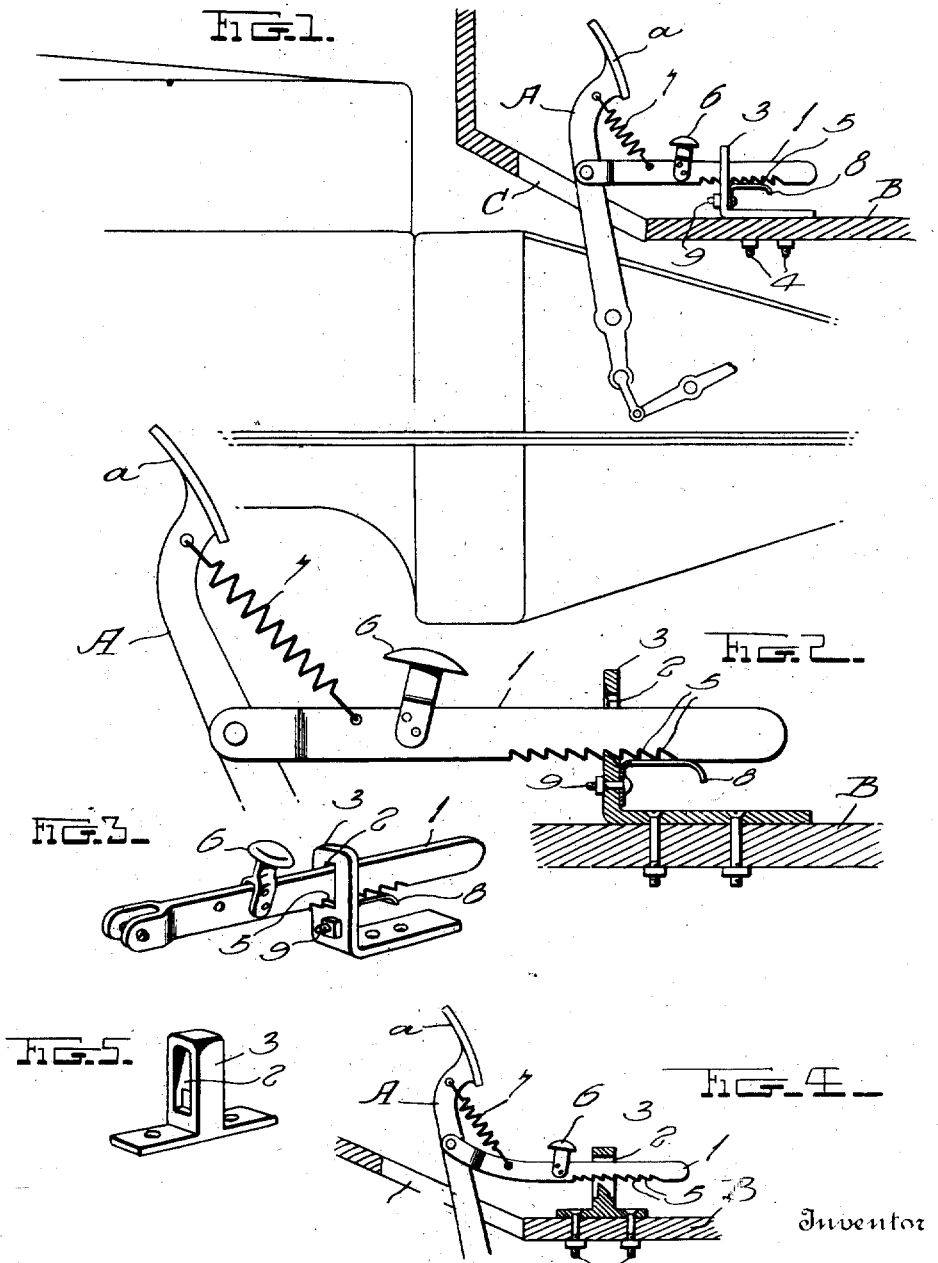

TELESPHORE MENARD, OF BOZEMAN, MONTANA.

AUTOMOBILE-PEDAL LOCK.

1,257,723.  Specification of Letters Patent.  Patented Feb. 26, 1918.

Application filed May 24, 1917. Serial No. 170,741.

*To all whom it may concern:*

Be it known that I, TELESPHORE MENARD, a citizen of the United States, residing at Bozeman, in the county of Gallatin and State of Montana, have invented certain new and useful Improvements in Automobile-Pedal Locks; and I do declare the following to be a full, clear, and exact description of the invention, such as will enable others skilled in the art to which it appertains to make and use the same.

This invention relates generally to automobile accessories, and more particularly to certain new and useful improvements in pedal locks for the same.

The primary object of the invention is to provide a means whereby one of the foot pedals of an automobile may be maintained in one of their positions without requiring the driver of the automobile keeping his foot upon the same.

Another object of the invention is to provide a lock of this class which can be readily attached to practically any type of automobile, it not being necessary to especially adapt the latter for the reception of the device.

A further object of the invention is to generally improve upon devices of this character by the provision of an extremely simple, strong, durable and inexpensive construction, one which will be efficient and reliable in operation, and well adapted to the purpose for which it is designed.

With these and numerous other objects in view, the invention consists of certain novel features of construction and the combination and arrangement of parts as will be hereinafter fully described and claimed.

In the accompanying drawings forming a part of the application, and in which similar reference characters designate like parts throughout the several views:—

Figure 1 is a side elevation of a device constructed in accordance with this invention, illustrating its application to an automobile;

Fig. 2 is an enlarged side elevation of the device showing the lever in locked position;

Fig. 3 is a perspective view of the device;

Fig. 4 is a side elevation of a modified form of the invention illustrating its application to an automobile; and, Fig. 5 is a perspective view of the type of bracket used in connection with this modified form.

Referring more particularly to the drawings the letter A designates the low gear foot pedal of an automobile, which as usual, is pivotally mounted at its lower end beneath the floor B of the car and extends through a slot or opening C into the body of the car in front of the driver's seat. At its upper end the pedal A is provided with a relatively fixed foot plate *a*. Pivotally connected at its forward end to the pedal A at a point spaced from the upper end of the latter is a bar 1. This bar 1 extends through an opening 2 in an upright bracket 3 which is firmly fixed to the floor B of the automobile by suitable bolts 4. Formed at the lower edge of the bar 1 is a series of rack teeth 5 which are adapted to engage the bracket 3 at the lower edge of the opening 2, said lower edge of said opening being arranged angularly as shown for this purpose.

Fixed to the bar 1 at a point adjacent the foot plate *a* of the pedal is a heel plate 6, the purpose of which will be hereinafter described.

The reference numeral 7 designates a coil spring, one end of which is connected to a pedal A adjacent the foot plate *a*, while the other end of the spring 7 is connected to the bar 1. A strap spring 8 engages the lower edge of the bar 1 and has one of its ends fixed to the bracket 3 by means of a suitable bolt 9. These springs 7 and 8 effectively hold the bar 1 in a raised position with the rack teeth 5 out of engagement with the lower edge of the opening 2 of the bracket 3.

A slight modification of the invention is shown in Figs. 4 and 5 of the drawings wherein the bar 1 is curved up a slight amount at its forward end, and the spring 8 has been entirely omitted, the spring 7 forming the sole means for holding said bar in its raised position.

In using a device such as above described, the pedal A is operated in the usual manner. If it is desired to lock this pedal in its forwardmost position or in any position, it is only necessary to engage the heel with the heel plate 6 so as to force the bar 1 downwardly so that one of the rack teeth 5 will engage the lower edge of the opening 2. The usual spring (not shown) which returns the pedal A to its rearwardmost position will of course be put under tension when said pedal is in any position forward of its rearmost position, and the pressure exerted by this pedal spring to return the pedal to its rearmost position will be sufficient to cause the rack teeth to be maintained in engagement with the bracket. When it is desired to unlock the pedal A and return it to its normal or any other position, it is only necessary to move the same a very slight distance forwardly so as to release the friction between the rack teeth and the bracket. The springs 7 and 8 will then force said bar 1 into its uppermost or raised position and the pedal spring will then return the pedal to its rearmost position when the foot is released from the pedal.

When the device is used in connection with the low gear pedal of an automobile, it will be found very convenient when the machine is being driven through mud, sand or snow or up a hill, as the driver of the machine does not have to keep his foot upon the pedal during the entire time which the machine is to be run at low speed.

From the foregoing description, taken in connection with the accompanying drawings, the construction, use and operation of the device will be readily understood without a more extended explanation.

As various changes in form, proportion, and in the minor details of construction may be resorted to without departing from the spirit of this invention it is to be understood that I do not wish to be limited to the construction herein shown and described.

I claim:

1. In an automobile, the combination with a foot pedal thereof, a rack bar pivotally connected at one end thereto, a bracket fixed to the floor of the automobile and adapted to be engaged by the teeth of said bar, and a spring connected to said pedal and said bar for normally maintaining the teeth of the latter out of engagement with said bracket.

2. In an automobile, the combination with a foot pedal thereof, a bracket fixed to the floor of the automobile and having an opening therein, a bar pivotally connected at one end to said pedal and extending through the opening in said bracket, the lower edge of said bar being provided with rack teeth adapted to engage said bracket at the lower edge of the opening thereof, and a coiled spring connected at its ends to said pedal and said bar for normally maintaining the teeth of the latter out of engagement with said bracket.

3. In an automobile, the combination with a foot pedal thereof, an upwardly extending bracket fixed to the floor of the automobile and having an opening therein, a bar pivotally connected at one end to said pedal at a point below the relatively fixed foot plate of the latter, said bar extending through the opening in said bracket and being provided with rack teeth adapted to engage the lower edge of said opening, a heel engaging plate fixed to said bar and disposed adjacent the foot plate of said pedal, and a coiled spring connected at its ends to said pedal and said bar for normally maintaining the teeth of the latter out of engagement with said bracket.

4. In an automobile, the combination with a foot pedal thereof, a bracket fixed to the floor of the automobile and having an opening therein, a bar pivotally connected at one end to said pedal and extending through the opening in said bracket, the lower edge of said bar being provided with rack teeth adapted to engage said bracket at the lower edge of the opening thereof, and a strap spring fixed at one end to said bracket and bearing upon the lower edge of said bar for normally maintaining the teeth of the latter out of engagement with said bracket.

5. In an automobile, the combination with a foot pedal thereof, a bracket fixed to the floor of the automobile and having an opening therein, a bar pivotally connected at one end to said pedal and extending through the opening in said bracket, the lower edge of said bar being provided with rack teeth adapted to engage said bracket at the lower edge of the opening thereof, a coiled spring connected at its ends to said pedal and said bar, and a strap spring fixed at one end to said bracket and bearing upon the lower side of said bar, said springs normally maintaining the teeth of the latter out of engagement with said bracket.

6. In an automobile, the combination with a lever thereof, a bar pivotally connected at one end to said lever, a bracket fixed to an immovable part of the automobile within the body of the same, said bar being adapted to engage said bracket to lock said lever out of its normal position, and spring means for normally maintaining said bar out of engagement with said bracket.

In testimony whereof I have hereunto set my hand in the presence of two subscribing witnesses.

TELESPHORE MENARD.

Witnesses:
 ROY M. KEISTER,
 MARION DUNDAS.